(12) United States Patent
Hashimoto et al.

(10) Patent No.: US 7,330,230 B2
(45) Date of Patent: *Feb. 12, 2008

(54) REFLECTION TYPE LIQUID CRYSTAL DISPLAY ELEMENT, DISPLAY UNIT, PROJECTION OPTICAL SYSTEM, AND PROJECTION DISPLAY SYSTEM

(75) Inventors: Shunichi Hashimoto, Kanagawa (JP);
Tadaaki Isozaki, Kanagawa (JP);
Minako Sugiura, Tokyo (JP)

(73) Assignee: Sony Corporation, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 10/362,646

(22) PCT Filed: Jun. 26, 2002

(86) PCT No.: PCT/JP02/06443

§ 371 (c)(1),
(2), (4) Date: Jul. 7, 2003

(87) PCT Pub. No.: WO03/001285

PCT Pub. Date: Jan. 3, 2003

(65) Prior Publication Data

US 2004/0105038 A1    Jun. 3, 2004

(51) Int. Cl.
*G02F 1/1335* (2006.01)
*G02F 1/1337* (2006.01)
*G02F 1/13* (2006.01)

(52) U.S. Cl. .................... 349/113; 349/5; 349/124; 349/200

(58) Field of Classification Search ............... 349/113, 349/5, 124, 200
See application file for complete search history.

(56) References Cited

U.S. PATENT DOCUMENTS

| | | | | |
|---|---|---|---|---|
| 5,268,781 | A | * | 12/1993 | Shigeta et al. ............. 349/125 |
| 5,309,264 | A | * | 5/1994 | Lien et al. .................. 349/143 |
| 5,329,387 | A | * | 7/1994 | Yanagisawa et al. ......... 349/76 |
| 5,532,854 | A | * | 7/1996 | Fergason .................... 349/200 |

(Continued)

FOREIGN PATENT DOCUMENTS

EP    0 294 900 A    12/1988

(Continued)

*Primary Examiner*—Huyen Ngo
(74) *Attorney, Agent, or Firm*—Sonnenschein Nath & Rosenthal LLP

(57) ABSTRACT

A superior reflex type vertically-aligned liquid crystal display device wherein the refractive index anisotropy Δn of its liquid crystal material is controlled to be more than 0.1, and the transmissivity of the liquid crystal is saturated with facility at a low voltage below 5 to 6V despite a reduction of the thickness of the vertically-aligned liquid crystal layer to less than 2 μm, hence achieving satisfactory driving at a practically low voltage while attaining another advantage of remarkable improvement in the transmissivity itself. Therefore, the display device indicates a sufficient transmissivity, an excellent low-voltage driving characteristic and a fast response. Further improvements are realizable in a display apparatus, a projection optical system and a projection display system by the use of such display device.

1 Claim, 16 Drawing Sheets

U.S. PATENT DOCUMENTS

| | | | | |
|---|---|---|---|---|
| 5,753,142 | A | * | 5/1998 | Plach et al. ............ 252/299.63 |
| 6,067,142 | A | * | 5/2000 | Anderson et al. ........... 349/130 |
| 6,097,466 | A | | 8/2000 | Koma |
| 6,155,685 | A | * | 12/2000 | Sawai et al. .................. 353/30 |
| 6,266,111 | B1 | * | 7/2001 | Kataoka et al. ............. 349/113 |
| 6,273,567 | B1 | * | 8/2001 | Conner et al. ................. 353/20 |
| 6,300,929 | B1 | * | 10/2001 | Hisatake et al. ............... 345/94 |
| 6,724,449 | B1 | * | 4/2004 | Andry et al. ................ 349/124 |
| 7,105,209 | B2 | * | 9/2006 | Heckmeier et al. .......... 428/1.1 |

FOREIGN PATENT DOCUMENTS

| | | |
|---|---|---|
| EP | 0 763 765 A | 3/1997 |
| JP | H06-0188869 | 1/1994 |
| JP | H11-048892 | 2/1999 |
| JP | H11-084419 | 3/1999 |
| JP | H11-153814 | 8/1999 |
| JP | H11-212053 | 8/1999 |
| JP | H11-232011 | 8/1999 |
| JP | H11-242221 | 9/1999 |
| JP | H11-249070 | 9/1999 |
| JP | 20 00-214421 | 8/2000 |
| JP | 2000-214428 | 8/2000 |
| JP | 2000-292815 | 10/2000 |
| JP | 2000281664 | 10/2000 |
| JP | 2000347417 | 12/2000 |
| JP | 2001-075174 | 3/2001 |
| JP | 2001343652 * | 12/2001 |
| WO | WO97/45768 | 12/1997 |
| WO | WO 00/46635 | 8/2000 |
| WO | WO 02/095494 | 11/2002 |

* cited by examiner

FIG. 5

| SAMPLE NO. | LIQUID CRYSTAL LAYER THICKNESS d ($\mu$m) | $\Delta$n OF LIQUID CRYSTAL | $\Delta\varepsilon$ OF LIQUID CRYSTAL | SATURATION VOLTAGE (V) | TRANS-MISSIVITY (%) | RESPONSE SPEED (msec) |
|---|---|---|---|---|---|---|
| 1 | 3.5 | 0.082 | -4.1 | 3.6 | 100 | 32 |
| 2 | 2.9 | 0.082 | -4.1 | 4.1 | 100 | - |
| 3 | 2.5 | 0.082 | -4.1 | 6.5 | 100 | - |
| 4 | 2 | 0.082 | -4.1 | 10 | 100 | - |
| 5 | 1.5 | 0.082 | -4.1 | 10 | 70 | - |
| 6 | 1 | 0.082 | -4.1 | 9 | 30 | - |
| 7 | 2 | 0.103 | -5.0 | 5 | 100 | 7.5 |
| 8 | 2 | 0.114 | -5.3 | 3.2 | 100 | 7.4 |
| 9 | 2 | 0.13 | -4.3 | 3 | 100 | 9 |
| 10 | 1.5 | 0.103 | -5.0 | 6.5 | 90 | 3.1 |
| 11 | 1.5 | 0.114 | -5.3 | 5 | 95 | 3.5 |
| 12 | 1.5 | 0.13 | -4.3 | 5 | 100 | 3.9 |
| 13 | 1 | 0.103 | -5.0 | 6.5 | 60 | 2 |
| 14 | 1 | 0.114 | -5.3 | 6 | 70 | 1.9 |
| 15 | 1 | 0.13 | -4.3 | 6 | 80 | 2.2 |
| 16 | 3.5 | 0.13 | -4.3 | 2 | 100 | 46 |
| 17 | 3.5 | 0.103 | -5.0 | - | - | - |
| 18 | 3.5 | 0.114 | -5.3 | - | - | - |
| 19 | 3.5 | 0.13 | -4.3 | - | - | - |

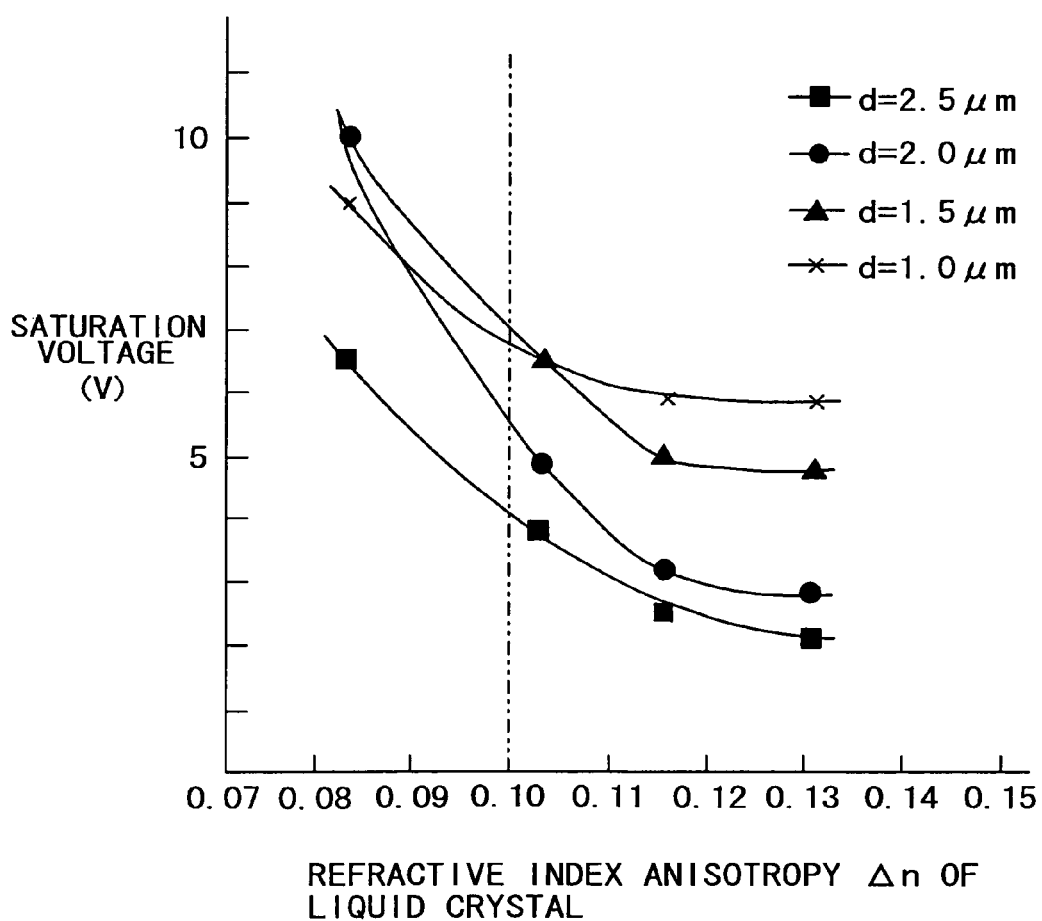
F I G. 6

REFLECTION TYPE LIQUID CRYSTAL DISPLAY ELEMENT, DISPLAY UNIT, PROJECTION OPTICAL SYSTEM, AND PROJECTION DISPLAY SYSTEM

BACKGROUND OF THE INVENTION.

The present invention relates to a reflex liquid crystal (electro-optical) display device adapted for a projection display system or the like, and also to a display apparatus, a projection optical system and a projection display system used in combination with such a display device.

With the recent progress in realizing improved projection display with a high definition, a small size and a high luminance, there are noted and practically utilized reflex display devices which are suited for achieving a dimensional reduction with an enhanced definition and are capable attaining a high optical efficiency.

Out of such display devices, there is reported an active reflex liquid crystal display device wherein a driving element is provided on a silicon substrate which is positioned opposite to a glass substrate having a transparent electrode formed therein and is composed of, e.g., a CMOS (complementary metal oxide semiconductor) circuit, and a driving circuit substrate having an aluminum optical reflecting electrode is placed thereon, and a vertically-aligned liquid crystal material is injected between the pair of such substrates (Paper (1): H. Kurogane et al., Digests of SID1998, p. 33–36 (1998); Paper (2): S. Uchiyama et al., Proceedings of IDW2000, p. 1183–1184 (2000)). The devices of this type have practically been commercialized by some makers.

Here, the vertically-aligned liquid crystal material is one having a negative permittivity anisotropy (i.e., $\Delta\epsilon$ (=$\epsilon(\|)$–$\epsilon(\bot)$), which is the difference between the parallel permittivity $\epsilon(\|)$ and the vertical permittivity $\epsilon(\bot)$ to the major axis of the liquid crystal molecule, is negative). When the voltage applied between its transparent electrode and light reflecting electrode is zero, the liquid crystal molecules are oriented to be substantially vertical to the substrate plane to thereby give display in a normally black mode.

The thickness (cell gap) of the vertically-aligned liquid crystal layer in the conventional reflex device reported in the above theses is 3 to 4 µm, and the curve of the liquid crystal transmissivity to the driving voltage applied to the liquid crystal (hereinafter referred to as V-T curve, which corresponds to the reflectivity of the device measured actually in the reflex device; it is supposed here that the incident light, e.g., s-polarized light, is modulated into p-polarized reflected light by the device as will be described later) has such characteristic that it rises at a threshold voltage of 2V or so and reaches its maximum value at an applied voltage of 4 to 6V. The transmissivity of the liquid crystal is changed analogously by changing the voltage between the electrodes to thereby realize expression of gradations. FIG. 14 graphically shows data excerpted as an example from Paper (1) cited above. According to the reported data, the liquid crystal layer has a thickness of 3 µm, the driving voltage is approximately ±4V, and the response speed (rise time+fall time) is 17 msec or so.

Normally the liquid crystal is driven while the voltage is inverted to be positive or negative per frame or field, so that the above device is actually driven by a voltage of ±4 to 6V at the maximum. (Since the positive and negative V-T curves are mutually symmetrical in principle, it is usual that the V-T curve is expressed as positive alone.) It is also defined that a liquid crystal driving voltage of ±4 to 6V needs to be more than 8 to 12V as an effective withstand voltage of a driving transistor.

Since this voltage is considerably higher than the with stand voltage in a normal MOS process, a high withstand voltage process for an LDD (lightly doped drain-source) structure or the like is applied to a liquid crystal driving transistor formed in each pixel on the silicon driving circuit substrate. Considering the production cost, power consumption and so forth, the withstand voltage is generally in a range of 8 to 12V. This is the reason that the known device is so designed as to have a V-T curve of ±4 to 6V at the maximum.

In the vertically-aligned liquid crystal material used in the known devices, the refractive index anisotropy $\Delta n$ (=$n(\|)$–$n(\bot)$, which is the difference between the refractive index $n(\|)$ along the major axis of the liquid crystal molecule and the refractive index $n(\bot)$ vertical thereto), has a value less than 0.1 (typically 0.08 or so), and the typical pixel pitch is 13.5 µm (pixel size 13 µm).

Recently, one defect of the liquid crystal display device concerning a low response speed thereof is attracting attention as a problem, and it is well known that raising the response speed is an important requisite. In general, the response speed (rise time and fall time) of the liquid crystal is proportional to the square of the thickness d of the liquid crystal layer, as expressed by Eq. (1) and Eq. (2) below. Therefore, reducing the thickness of the liquid crystal layer is effective to attain a higher response speed.

$$\text{rise time: } \tau on = \frac{\gamma \cdot d^2}{\epsilon(0)\Delta(V^2 - Vc^2)} \quad (1)$$

$$\text{fall time: } \tau off = \frac{\gamma \cdot d^2}{K \cdot \pi^2} \quad (2)$$

(where γ: viscosity of liquid crystal, d: thickness of liquid crystal layer, $\Delta\epsilon$: permittivity anisotropy of liquid crystal, $\epsilon(0)$: space permittivity, K: elastic constant of liquid crystal, V: voltage applied to liquid crystal (liquid crystal driving voltage), Vc: threshold voltage).

However, in the vertically-aligned liquid crystal display device known heretofore, although the response speed thereof is rendered higher according to Eqs. (1) and (2) with reduction of the thickness of the liquid crystal layer, there arises another problem that the driving voltage required for saturating the transmissivity becomes higher. FIG. 15 graphically shows V-T curves obtained by reducing the thickness of the liquid crystal layer in a system using a liquid crystal material (where $\Delta n$=0.082) employed in a conventional device, and FIG. 16 graphically shows changes caused in the saturation voltage with the thickness d of the liquid crystal layer.

As shown in FIGS. 15 and 16, the saturation voltage of the device becomes sharply higher over 6V after the thickness d of the liquid crystal layer is reduced to less than 2.5 µm, and the saturation voltage reaches high as 10V or so when the thickness d is less than 2 µm. That is, the withstand voltage required for the driving transistor needs to be higher than 20V. In addition, when the thickness d is less than 1.5 µm, the absolute value of the transmissivity fails to reach 100%. In case the thickness d is 1 µm, the transmissivity attainable is merely 30% or so, while the threshold voltage is raised to be higher.

Such a phenomenon is considered to result from that, with a reduction of the thickness d (cell gap) in the vertically-aligned liquid crystal, the interaction exerted on the interface between the liquid crystal molecules and the orientation film becomes relatively greater to the directional change caused in the director of the liquid crystal molecules by the applied voltage. To the contrary, when the liquid crystal layer has a sufficient thickness, the director is rendered more mobile due to the property as a bulk, whereby the interaction on the interface is decreased in effect.

As described above, if the driving voltage becomes higher in the liquid crystal display device, proper driving fails to be performed in an ordinary driving device substrate of silicon. It is a matter of course that this problem can be solved by raising the withstand voltage of the pixel driving transistor, but generally the process is complicated with further disadvantages of increasing both the production cost and the power consumption. Further due to such a rise of the withstand voltage, it is unavoidable that the transistor size is enlarged. For this reason, it becomes extremely difficult to manufacture high withstand-voltage transistors in a small pixel size (or pitch) less than 10 µm or so in particular.

For the reason mentioned above, it is practically difficult, in any known reflex display device using the conventional vertically-aligned liquid crystal, to reduce the thickness of the liquid crystal layer to less than 2.5 µm.

Reducing the thickness of the liquid crystal layer as described slows down the rise (response speed) to the applied voltage and lowers the yield in manufacture of the device.

Further, in any projection optical system equipped with such known display device, the F number of the optical unit needs to be equal to or greater than 3.5 for maintaining a high contrast as will be explained below, hence bringing another problem that a high luminance is not attained.

In any projection system equipped with reflex liquid crystal display devices, as shown in FIG. 17, there is required an optical unit wherein luminous flux emitted from a lamp light source 1 is irradiated to reflex liquid crystal display devices 3R, 3G, 3B, each using vertically-aligned liquid crystal, via polarized beam splitters 2R, 2G, 2B which serve as polarized light separating devices for red (R), green (G) and blue (B) respectively, and the reflected light beams modulated by such devices are collected by a prism (X-cube prism) 4 which synthesizes the light beams of the individual colors, and then the composite light beam is projected as projection light 10(p) to an unshown screen via a projection lens 5.

Here, in an illumination optical unit for illuminating the reflex liquid crystal devices 3R, 3G, 3B, the white light (10(p,s) composed of p-polarized component and s-polarized component) from the white lamp light source 1 is processed to be s-polarized light 10(s) via a fly-eye lens 6, a polarizer/converter 7, a condenser lens 8 and so forth. Subsequently the s-polarized light 10(s) is introduced to a dichroic color separation filter 9, and the light separated therethrough is sent to total reflection mirrors 11, 12 and a dichroic mirror 13 to consequently become light 10R(s), 10G(s) and 10B(s) of individual colors. Thereafter the light is incident upon the reflex liquid crystal display devices 3R, 3G, 3B respectively via the polarized beam splitters 2R, 2G, 2B, and the reflected light is polarized and modulated in accordance with the voltage applied to the reflex liquid crystal display devices 3R, 3G, 3B. After incidence upon the polarized beam splitters 2R, 2G, 2B again, only the p-polarized components 10R(p), 10G(p), 10B(p) of the light are transmitted and then are synthesized by the prism 4. Consequently, when the applied voltage is zero in the reflex liquid crystal display device, the incident light is reflected directly as s-polarized light without passing through the polarized beam splitter, and thus the system is placed in a normally black mode where the light is polarized and modulated with a rise of the applied voltage, so that the p-polarized reflected light is increased to eventually raise the transmissivity (refer to FIG. 14).

In the optical unit employed for the known vertically-aligned liquid crystal display device reported in Papers (1) and (2), the F number is equal to or greater than 3.5 (e.g., 3.8 to 4.8 in Paper (1), or 3.5 in Paper (2)). The F number of the optical unit is a function of the incidence angle (outgoing angle of reflected light) θ of the light incident upon the device, and it is expressed as follows.

$$F=1/(2\times\sin\theta) \qquad (3)$$

An expression of F=3.5 signifies that the device face is illuminated by the light within an angle of θ=±8.2° centering around a line perpendicular to the device face, and the reflected light is obtained therefrom.

As obvious from Eq. (3), the smaller the F number, the light incidence and outgoing angle θ become greater to consequently increase the total luminous flux, hence raising the luminance. However, in the reflex liquid crystal device, generally the black level value (transmissivity in a black state) becomes higher with an increase of the incidence angle, and the polarized-light separation characteristic of the polarized beam splitter is dependent on the angle θ, whereby it is unavoidable that the characteristic is deteriorated with an increase of the angle θ, and the degree of separation into the p-polarized light component and the s-polarized light component is rendered lower when the angular component is great. For the reasons mentioned, there occurs a phenomenon that the black level rises while the contrast is considerably lowered.

Thus, in practical use, there exists a problem of trade-off (difficulty for compatibility) between the luminance and the contrast. Because of this problem, in any conventional projection system equipped with such a known device, there is employed an optical unit where the F number is greater than 3.5 (more specifically, the F number of the projection lens 5 or that of the illumination optical unit). That is, in any projection optical system equipped with the known device, the F number is not settable to less than 3.5 due to a demand for practically realizing a high contrast to a certain degree, hence causing a failure in raising the luminance.

It is therefore a first object of the present invention to provide improvements in a vertically-aligned liquid crystal display device which is represented by a reflex liquid crystal display device of the invention having a high response speed, wherein the liquid crystal transmissivity reaches saturation at a low voltage despite a small thickness of the liquid crystal layer, and the device can be driven with facility on a driving circuit substrate manufacturable by an ordinary withstand voltage process even in a small pixel size. The above improvements also connote a display apparatus, a projection optical system and a projection display system using such a reflex liquid crystal display device of the invention.

A second object of the present invention resides in providing a projection optical system and a projection display system where a sufficiently low black level can be maintained in addition to the above accomplishment even in a high-luminance optical unit having a small F number, hence achieving a practically high contrast (i.e., meeting the requirements for both a higher luminance and a higher contrast in comparison with those of any conventional system).

SUMMARY OF THE INVENTION.

More specifically, the reflex liquid crystal display device of the present invention is such that a first substrate having a light transmissive electrode and a second substrate having a light reflective electrode are positioned opposite to each other in a state where the light transmissive electrode and the light reflective electrode are mutually opposed while a vertically-aligned liquid crystal layer is interposed therebetween. In this display device, the vertically-aligned liquid crystal layer has a thickness of less than 2 μm, and the vertically-aligned liquid crystal material has a refractive index anisotropy Δn of more than 0.1. Here, the definition of "light reflective electrode" signifies an electrode being reflective itself to light, an electrode having a light reflective layer thereon, and also an electrode which may be transmissive itself to light but has an undercoat film on condition that light reflectivity is effected in the interface between the electrode and the undercoat film.

The present invention relates also to a display apparatus equipped with the reflex liquid crystal display device of the invention, and further to a projection optical system where the reflex liquid crystal display device is disposed in its optical path, and a projection display system using such an optical system.

According to the present invention, although the vertically-aligned liquid crystal layer is less than 2 μm in thickness, the value Δn of the vertically-aligned liquid crystal material is adjusted to be more than 0.1 differently from the conventional recognition, so that the transmissivity of the liquid crystal reaches its saturation with facility at a voltage lower than 5–6V, hence enabling satisfactory driving at a practically low voltage and much enhancing the transmissivity itself. Consequently, it becomes possible to achieve improvements in the reflex vertically-aligned liquid crystal display device having a sufficient transmissivity and superior driving characteristic with low-voltage driving (low required withstand voltage) while holding a high response speed, and also in a display apparatus, a projection optical system and a projection display system using such improved display device.

The remarkable advantageous functions and effects mentioned above are obtainable due particularly to the selective use of a vertically-aligned liquid crystal material having a value Δn of more than 0.1. In case the liquid crystal layer is reduced in thickness to less than 2 μm for attaining a high response speed, if the directional change of the director is to be affected by the interaction between the orientation film and the liquid crystal molecules, the incident light is prone to be polarized and modulated, since Δn is greater than 0.1, in the liquid crystal in compliance with the applied voltage to eventually cause ready separation of the polarized light, whereby the desired transmissivity can be obtained even at a low voltage.

The present invention also provides a projection optical system where the reflex liquid crystal display device of the invention and an optical unit having an F number of less than 3 are disposed in its optical path, and further provides a projection display system using such an optical system.

According to the above systems, a black level supposed to be proportional to the square of the thickness of the liquid crystal layer can be kept low as the thickness of the vertically-aligned liquid crystal layer is set to less than 2 μm, and therefore a high contrast can be realized even if the F number of the optical unit is less than 3, and yet a high luminance is also attainable with such a small F number. Thus, the projection optical and display systems, each of which is equipped with the reflex liquid crystal device of the invention and an optical unit having an F number under 3, satisfy the requirements for a higher contrast and a higher luminance in comparison with those of any conventional system using the known device and optical unit. The F number of the optical unit is controllable by the focal distance and so forth of a lens used therein.

BRIEF DESCRIPTION OF DRAWINGS

FIG. 5 is a table of data representing the saturation voltage, transmissivity and response speed of each sample obtained in relation to the thickness d, refractive index anisotropy Δn and permittivity anisotropy Δε of a vertically-aligned liquid crystal material in a reflex liquid crystal display device;

FIG. 6 graphically shows comparative changes of the saturation voltage with the refractive index anisotropy Δn of the same liquid crystal in relation to the thickness d of the liquid crystal layer;

Figure 1:
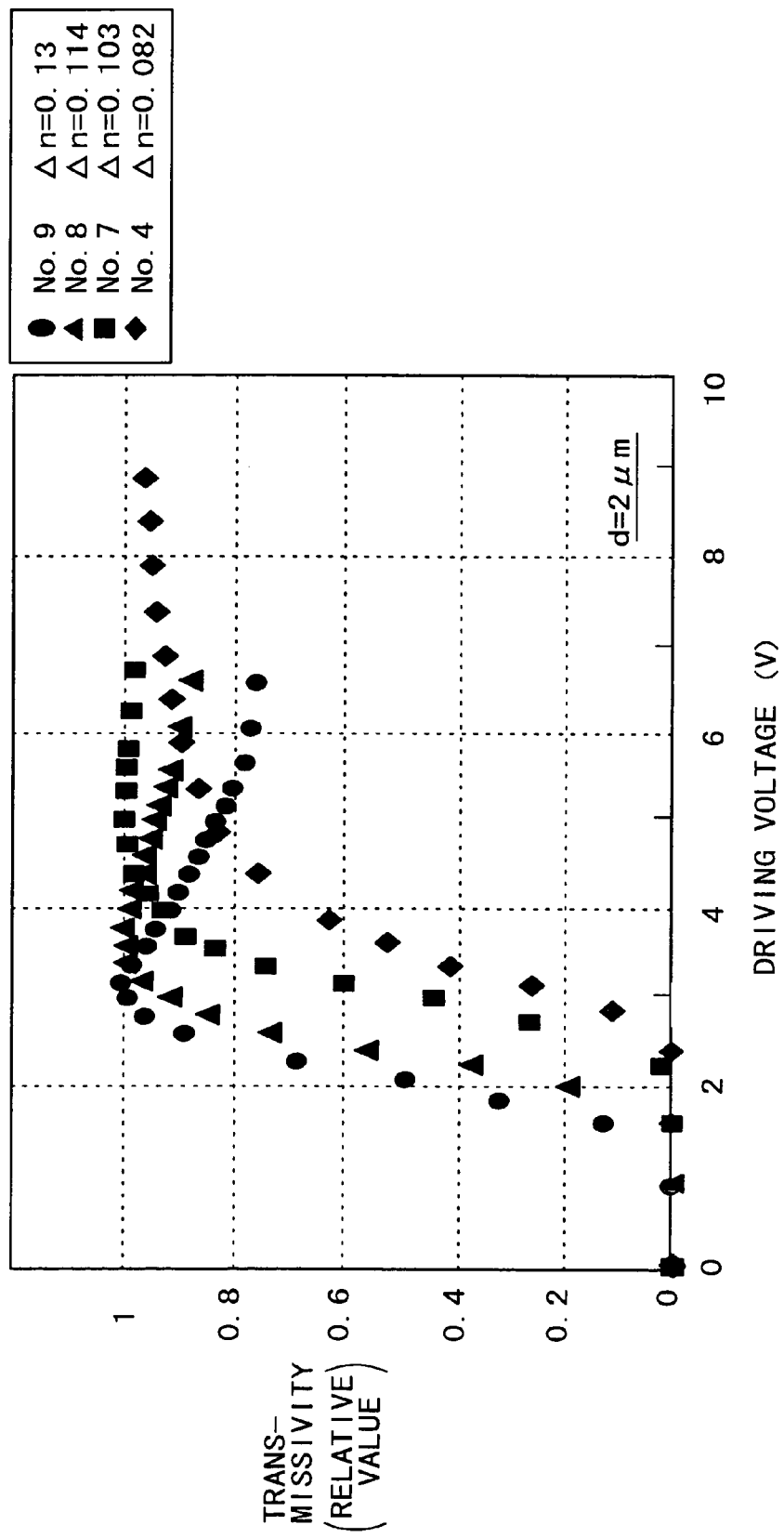
FIG. 1 graphically shows V-T curves obtained by changing the refractive index anisotropy Δn of a vertically-aligned liquid crystal material in a reflex liquid crystal display device (where the thickness d of a liquid crystal layer is 2 μm)

DETAILED DESCRIPTION OF THE PRESENTLY PREFERRED EMBODIMENTS.

In the reflex liquid crystal display device of the present invention, the thickness of the vertically-aligned liquid crystal layer needs to be equal to or less than 2 μm for achieving the functional effects mentioned above. It is more preferred that the thickness be in a range of 0.8 to 2 μm, and further in a range of 1 to 2 μm. Although the response speed is raised with a reduction of the layer thickness, the lower limit of the thickness is preferably 0.8 μm, and more preferably 1 μm in regard to suppression of the interaction to the orientation film and also in regard to controllability of the layer thickness. While the thickness of the liquid crystal layer may be small, Δn needs to be greater than 0.1 in order to enhance the polarized light separation, but an excessive increase of Δn is not exactly efficient for enhancing the effect or is not practical either. Therefore, Δn may preferably be less than 0.25.

In a preferred structure, a liquid crystal orientation film is formed on the opposed face of a transparent electrode of ITO (indium tin oxide) or the like as the aforementioned light transmissive electrode and also on the opposed face of the light reflective electrode of aluminum or the like, and the light reflective electrode is connected to a single crystal semiconductor driving circuit of silicon or the like provided on the aforementioned second substrate, thereby constituting an active driving type. If a driving circuit substrate of silicon is employed as the second substrate, the substrate itself is opaque and adapted for reflex type. Moreover, a MOS (metal oxide semiconductor) transistor as a driving element and an auxiliary capacity for voltage supply are suited for high-density integration attained with a minute pattern by the semiconductor processing technology, so that it becomes possible to realize a high aperture rate, a high resolution due to enhancement of a pixel density, reduction of a cell size, and enhancement of a carrier transfer rate.

Actually, the driving circuit comprises a driving transistor such as MOSFET (metal oxide semiconductor field effect transistor) provided for each pixel on the silicon substrate, and the light reflective electrode is connected to the output side of the driving transistor. The pixel size can be reduced to equal to or less than 10 μm due to the use of a low withstand voltage transistor which is drivable at a low voltage. And the liquid crystal display device is also reducible in size to equal to or less than 2 inches diagonally.

Orientation control of the vertically orientated liquid crystal material may preferably be performed by means of a liquid crystal orientation film composed of a silicon oxide film. Such an orientation film can be formed by vacuum evaporation or the like with directivity (i.e., capable of easily controlling the pretilt angle of liquid crystal molecules).

In a display apparatus equipped with the reflex liquid crystal display device of the present invention and also in projection optical and display systems where such liquid crystal display device is disposed in the optical path thereof (further with an optical unit having an F number under 3), a light source and an optical unit for enabling incidence of the light from the light source onto the reflex liquid crystal display device may preferably be disposed in the optical path together with the reflex liquid crystal display device and another optical unit for introducing the reflected light from the reflex liquid crystal display device.

In this case, it is preferred that the light emitted from the light source is incident upon the reflex liquid crystal display device via a polarizer/converter and a polarized beam splitter, and the reflected light from the reflex liquid crystal display device is introduced via the polarized beam splitter again or is introduced further via a projection lens to a screen.

It is also preferred that the reflex liquid crystal display device and the polarized beam splitter are disposed for each of colors, and the reflected light components from the individual reflex liquid crystal display devices are synthesized or are introduced further to the projection lens. More concretely, white light emitted from a white light source is introduced via the polarizer/converter to a dichroic color separating filter, which then separates the light into respective light components of the individual colors. Subsequently, the light components are incident upon the reflex liquid crystal display devices respectively via the polarized beam splitter, and the reflected light components therefrom are synthesized by means of a prism.

Here, the F number of the optical unit used in combination with the reflex liquid crystal display device of the invention needs to be a small value of less than 3 for attaining compatibility of a high contrast and a high luminance. Preferably, however, the F number is desired to be not more than 3.0 and not less than 1.5 (further not less than 2.0) in order to enhance the effect.

Now a preferred embodiment of the present invention will be described below in detail with reference to the accompanying drawings.

Figure 11:
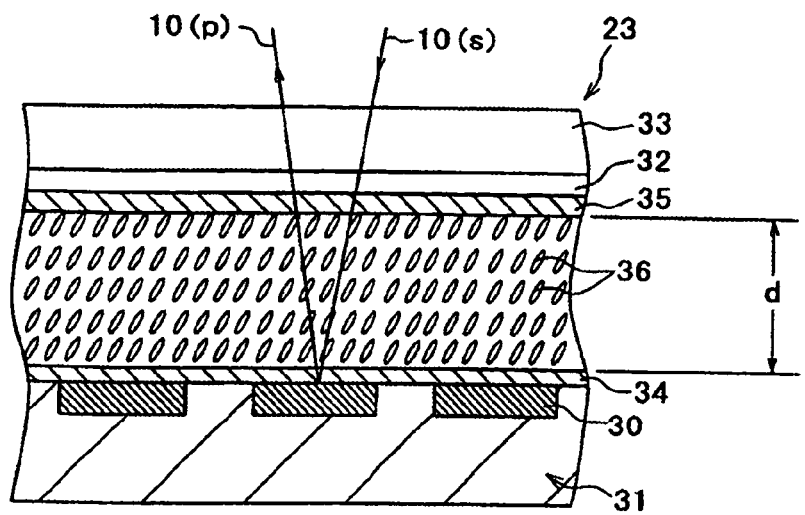
FIG. 11 is a schematic sectional view of the reflex vertically-aligned liquid crystal display device of the present invention.

First, FIG. 11 shows the fundamental configuration of a liquid crystal electro-optical device constituting a display apparatus which is represented by the preferred embodiment.

Figure 12:
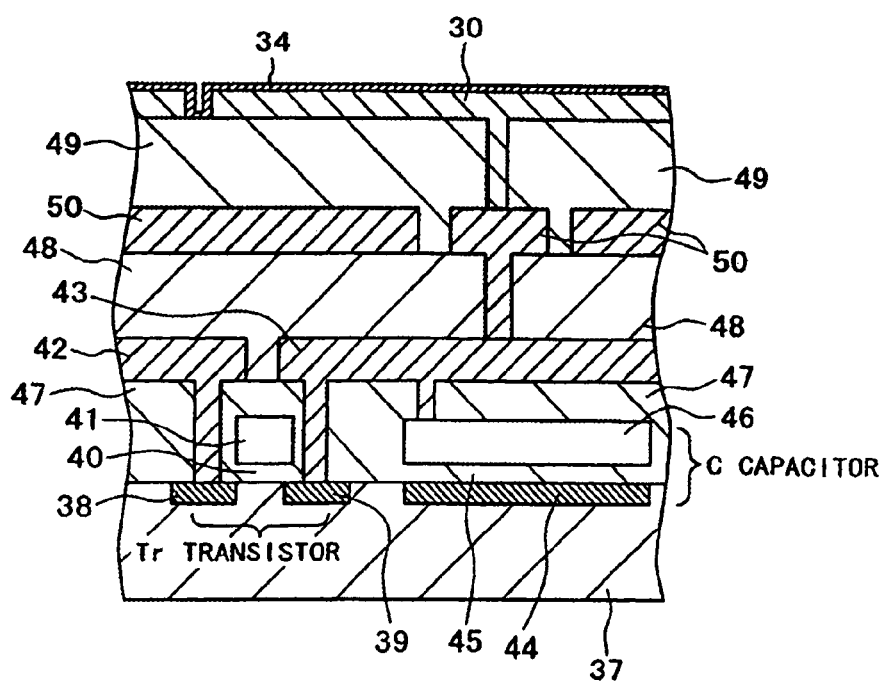
FIG. 12 is a sectional view of principal portions on a driving circuit substrate of silicon in the display device of the invention.

This device serving as a reflex liquid crystal display device 23 comprises a silicon driving circuit substrate 31 composed of single crystal of silicon or the like and having a light reflective electrode 30 of a pixel structure, and a transparent substrate 33 of glass or the like having a transparent electrode 32 and positioned opposite to the substrate 31, wherein a vertically-aligned liquid crystal 36 is sealed between the two substrates (actually between liquid crystal orientation films 34 and 35). As shown in FIG. 12, a reflective electrode substrate serving as the driving circuit substrate is such that a driving circuit comprising CMOS and n-channel MOS transistors Tr and capacitors C is formed on a single crystal silicon substrate 37, and a light reflective electrode 30 of a pixel structure is formed thereon with a metal film of aluminum, silver or the like. In case the light reflective electrode is composed of metal such as aluminum, it functions as both a light reflecting film and an electrode to apply a voltage to the liquid crystal. For the purpose of further raising the light reflectivity, a light reflective layer with a multi-layer film such as a dielectric mirror may also be formed on the aluminum electrode.

Figure 17:
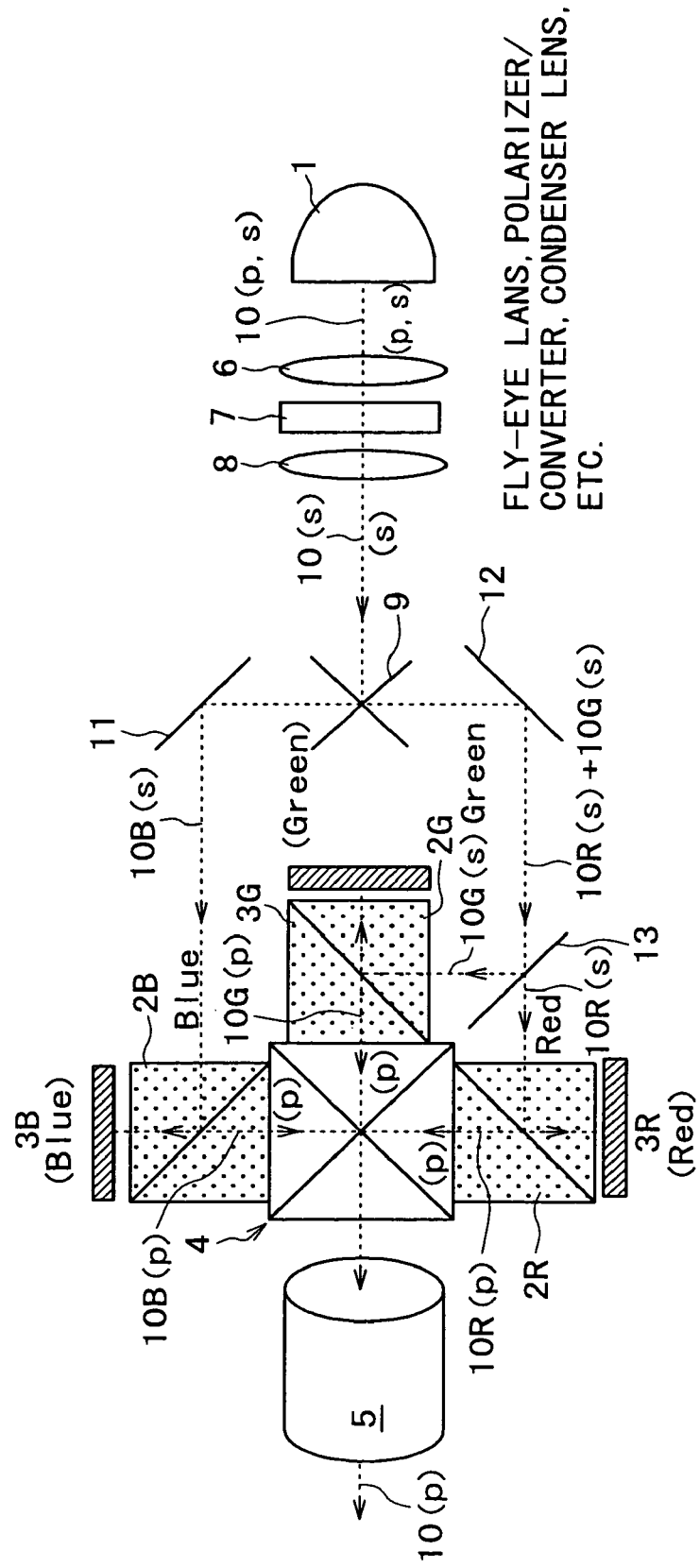
FIG. 17 is a schematic diagram of a projection optical system using the known reflex liquid crystal display device.

In FIG. 12, the transistor Tr comprises, for example, an n-type source region 38, a drain region 39, a gate insulating film 40 and a gate electrode 41, wherein electrodes 42 and 43 are led out from the active regions respectively. In this structure, the electrode 43 is connected via an inter-layer insulating film 47 to a capacitor electrode 46 which is in contact with an insulating film (dielectric film) 45 on an n-type region 44 constituting a capacitor C. The electrode 43 is connected also to a wire 50 via inter-layer insulating films 48, 49 and further to the light reflective electrode 30. In this device, the s-polarized incident light 10(s) shown in FIG. 17 is converted in accordance with the applied voltage in the layer of the vertically-aligned liquid crystal 36, whereby reflected light 10(p) including p-polarized light is obtained, and then the light 10(p) is introduced to the aforementioned polarized beam splitter 2.

In the reflex liquid crystal display device of the present invention, the layer thickness d (cell gap) of the vertically-aligned liquid crystal 36 is set to be equal to or less than 2 µm, and the refractive index anisotropy Δn of the vertically-aligned liquid crystal 36 employed here is more than 0.1.

Figure 13:
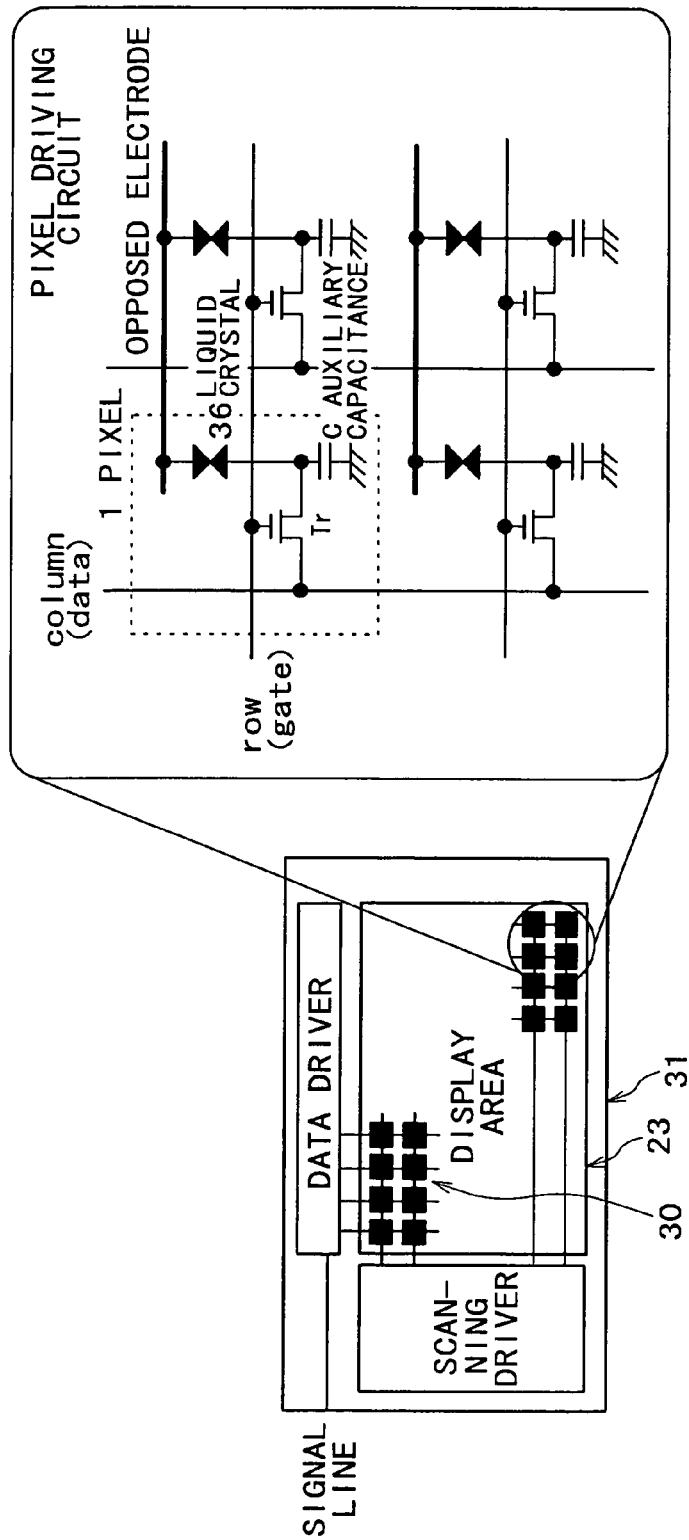
FIG. 13 is an equivalent circuit diagram with the layout of the display device of the invention.
Figure 14:
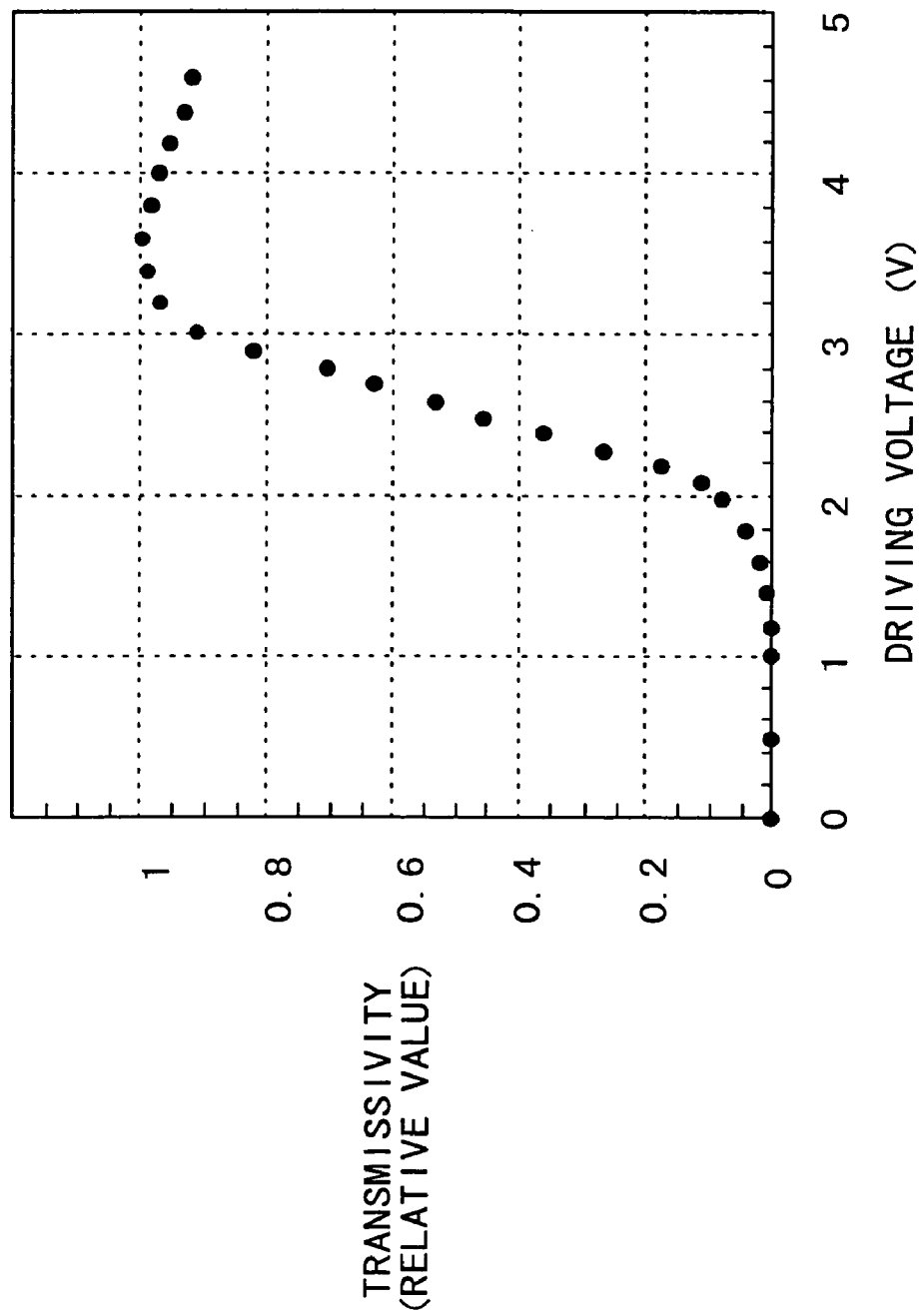
FIG. 14 graphically shows a V-T curve of the known device (where the thickness of its liquid crystal layer is approximately 3 μm)

FIG. 13 shows a fundamental layout of the display device and an equivalent circuit of its pixel portion. The silicon driving circuit substrate 31 comprises a pixel driving circuit formed in each pixel, and a logic driver circuit (data driver, scanning driver and so forth) incorporated in the periphery of a display area. The pixel driving circuit formed under each light reflective (pixel) electrode 30 consists of a switching transistor Tr and an auxiliary capacitance C for supplying a voltage to the vertically-aligned liquid crystal 36. The transistor Tr is required to withstand a predetermined voltage corresponding to the driving voltage for the vertically-aligned liquid crystal, and it is produced normally by a higher withstand voltage process as compared with the logic. Since the transistor size becomes greater with a rise of the withstand voltage, usually a transistor having a withstand voltage of 8 to 12V or so is used in view of the production cost and the power consumption. Therefore, it is desired to design that the liquid crystal driving voltage is set within ±6V. This requirement can be met according to the present invention.

In the vertically-aligned liquid crystal 36 used in this display device, each molecule is so oriented that the major axis thereof is rendered substantially vertical to the substrate when no voltage is applied, and upon application of a voltage, the major axis is inclined to the in-plane direction to thereby change the transmissivity. If the inclinations of the liquid crystal molecules are not the same directionally when the liquid crystal is driven, there occurs some non-uniformity in brightness and darkness. In order to avoid such a disadvantage, it is necessary to vertically orient the liquid crystal by previously giving a slight pretilt angle in a fixed direction (generally in the diagonal direction of the device) as shown in FIG. 11.

If the pretilt angle is excessively large, the vertical orientation characteristic is deteriorated with a rise of the black level to eventually lower the contrast while affecting the V-T curve. Therefore, the pretilt angle is controlled generally within a range of 1° to 7°. Each of the liquid crystal orientation films 34 and 35 to be given such a pretilt angle is composed of a silicon oxide film represented by $SiO_2$, such as an oblique evaporated film, or a polyimide film. In the former, the evaporation angle given at the time of oblique evaporation is in a range of 45° to 55°; meanwhile in the latter, the pretilt angle is controlled within a range of 1° to 7° by changing the rubbing condition.

In the known device, the thickness d of the vertically-aligned liquid crystal layer in the device structure of FIG. 11 is approximately 3 to 4 µm, and there is used a selected liquid crystal material where the refractive index anisotropy Δn is less than 0.1 (typically 0.08 or so). However, if the thickness d of the liquid crystal layer in the known device is reduced to less than 2.5 µm, the response speed is rendered higher but the driving voltage is raised as described above, so that the requirements for practical use fail to be satisfied. The mechanism of this phenomenon that the driving voltage is raised with reduction of the thickness of the liquid crystal layer is not exactly definite, but it is considered to be derived from that, while the bulk property of the liquid crystal appears principally with an increase of the layer thickness, the influence of the interaction on the interface between the orientation film and the liquid crystal is not negligible (i.e., the interaction is supposedly so exerted as not to incline the liquid crystal molecules).

Figure 2:
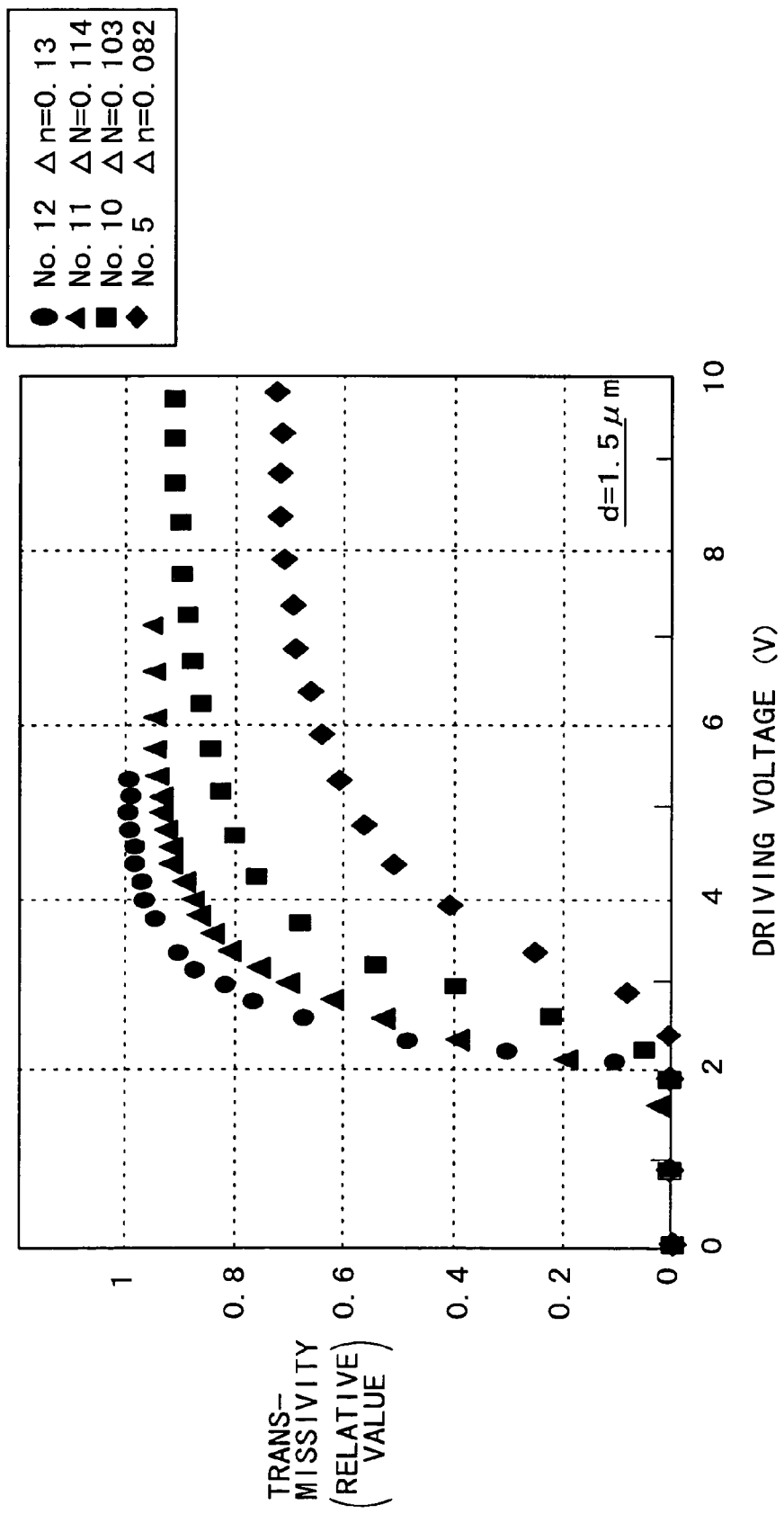
FIG. 2 graphically shows V-T curves obtained by changing the refractive index anisotropy Δn of a vertically-aligned liquid crystal material in a reflex liquid crystal display device (where the thickness d of a liquid crystal layer is 1.5 μm)

As the result of repeating many experiments in order to overcome the problems mentioned above, the inventor has found that the problems can be solved by selectively controlling the refractive index anisotropy Δn of the vertically-aligned liquid crystal material to more than 0.1. FIGS. 1 and 2 graphically show V-T curves obtained by changing the anisotropy Δn of the liquid crystal under conditions that the thickness d of the liquid crystal layer is 2 µm and 1.5 µm, respectively. It is seen from these diagrams that, despite reduction of the thickness d of the liquid crystal layer to less than 2 µm in particular, the transmissivity is easily saturated at a low voltage of 4 to 6V or less if the anisotropy Δn is held over 0.1, whereby practical driving is achievable.

Figure 3:
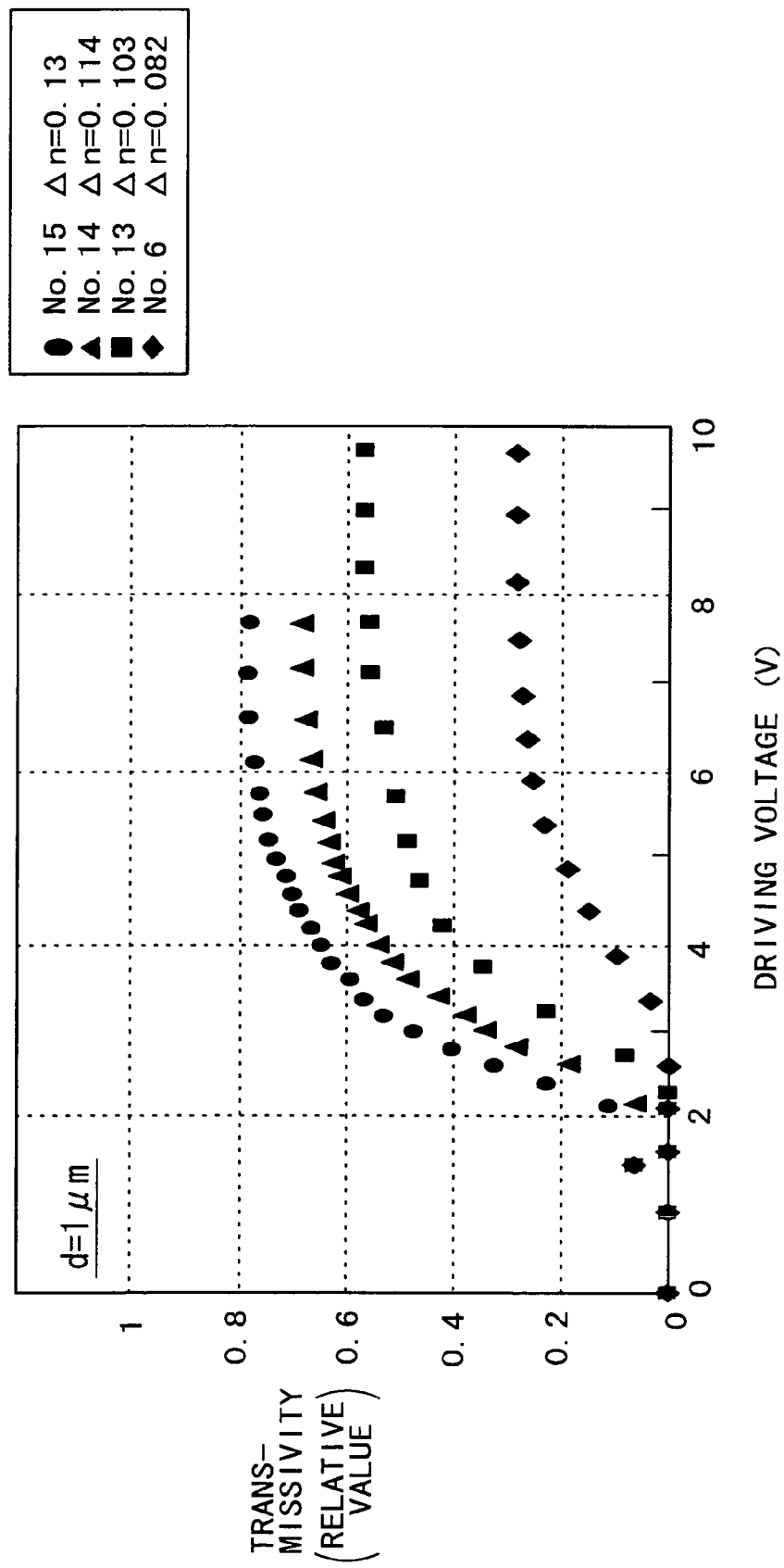
FIG. 3 graphically shows V-T curves obtained by changing the refractive index anisotropy Δn of a vertically-aligned liquid crystal material in a reflex liquid crystal display device (where the thickness d of a liquid crystal layer is 1 μm)

According to the present invention, even in a display device where the thickness d of its liquid crystal layer is extremely small as 1 µm, the transmissivity is saturated at a low driving voltage of 6V or so if the anisotropy Δn is held over 0.1, as shown in FIG. 3. It is also seen that remarkable improvements can be attained in comparison with any conventional device where the transmissivity obtained by using the known material composition is merely 30% or so. Particularly due to the use of a selected liquid crystal material having a high value of Δn=0.13, it is possible to realize, even with a thickness of 1 µm, an excellent reflex display device which uses vertically-aligned liquid crystal of silicon and indicates a sufficient transmissivity with superior driving characteristic.

Figure 4:
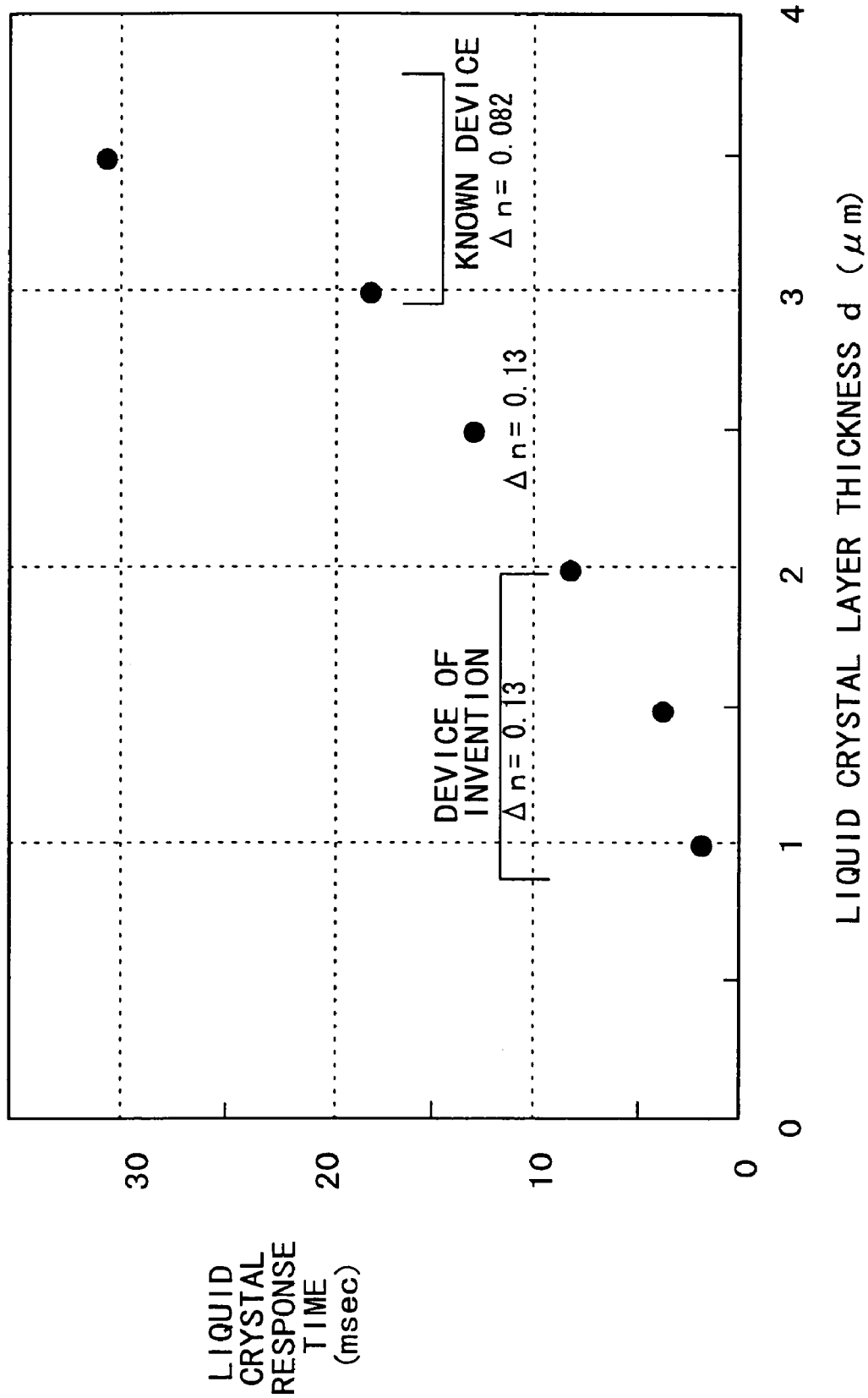
FIG. 4 graphically shows the response speeds of a reflex vertically-aligned liquid crystal display device (where samples being 3 μm and 3.5 μm thick indicate values of known devices)

FIG. 4 graphically shows the response speed (rise time+fall time) of the reflex liquid crystal display device according to the present invention. As plotted, the response is much faster in comparison with that in any conventional device, such as 7 to 9 msec with d=2 µm, or under several msec with d=1.5 µm or less. (However, with d=2.5 µm, the response speed is lowered to 13–14 msec.) In the device with d=1.5 µm or less, the fast response is kept under 8 msec even in a half tone. This device is capable of realizing a satisfactory image quality even in motion pictures of movies or television pictures where half-tone display is frequently employed with many moving images.

FIG. 5 is a table showing the characteristics of the display device (samples Nos. 7–15) of the present invention and those of comparative examples (samples Nos. 1–6, 16–19). FIG. 6 graphically shows changes of a saturation voltage with Δn in relation to the thickness d of a liquid crystal layer. In view of the driving characteristic, the transmissivity and the response speed, suitable values adapted for practical use are as follows. The thickness d of the liquid crystal layer is preferably less than 2 µm, and particularly 1 to 2 µm; Δn of the liquid crystal with d =2 µm is preferably Δn≧0.1 (more preferably Δn≧0.103, further preferably Δn≧0.114); with d=1.5 µm, Δn≧0.106 (more preferably Δn≧0.11, further preferably Δn≧0.114); and with d=1 µm, Δn≧0.104 (more preferably Δn≧0.114, further preferably Δn≧0.12).

Figure 7:
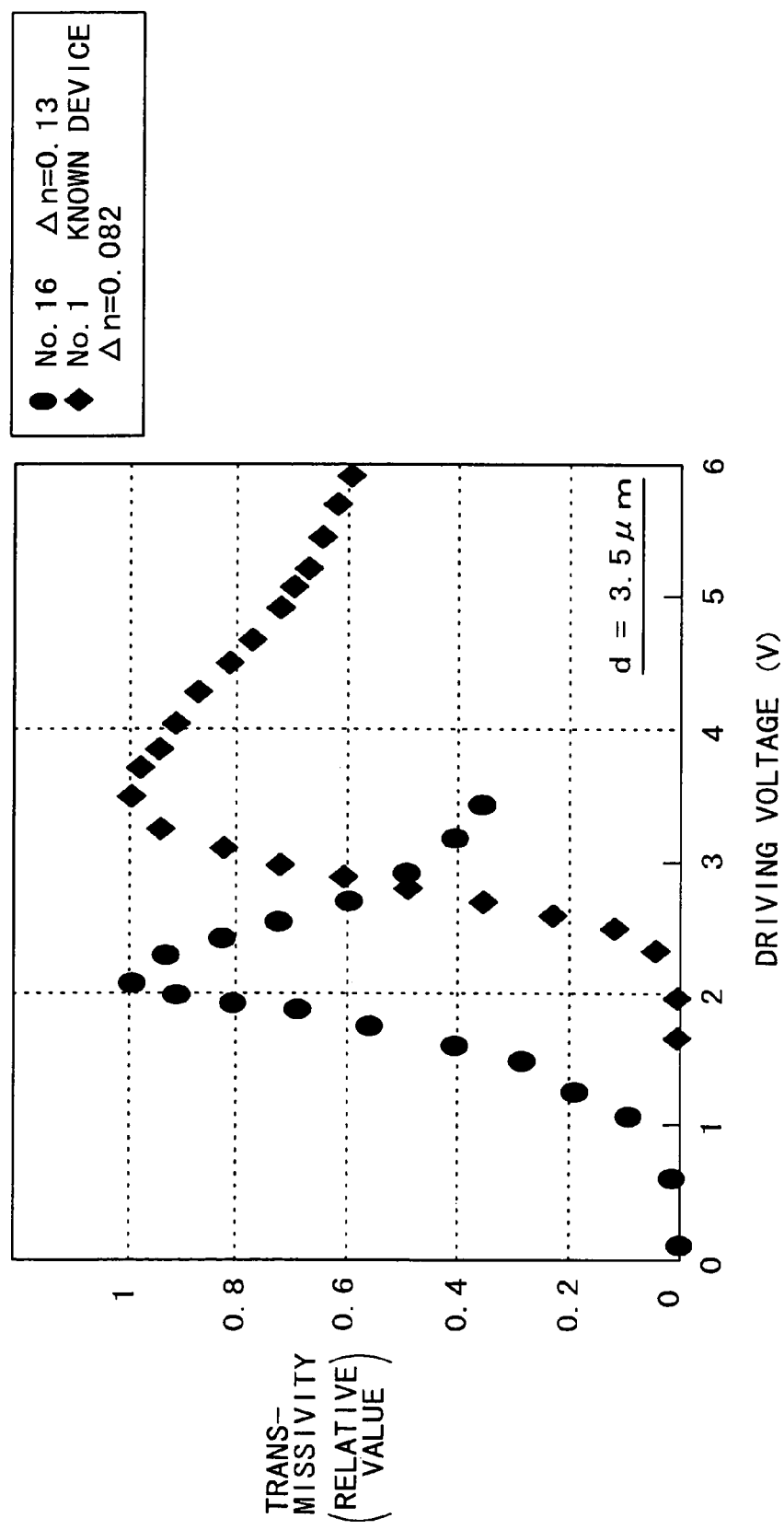
FIG. 7 graphically shows V-T curves obtained when the thickness of the same liquid crystal layer is 3.5 μm and the refractive index anisotropy Δn of the liquid crystal is 0.13.

FIG. 7 graphically shows V-T curves obtained when the thickness of the liquid crystal layer in the known device is 3.5 μm by the use of a vertically-aligned liquid crystal material having a high refractive index anisotropy Δn of more than 0.1, i.e., in the case of Δn=0.13 for example. As seen from this graph, the threshold voltage is considerably lowered, and saturation is attained at a driving voltage of approximately 2V. However, as obvious from the aforementioned Eq. (1), the response speed is in inverse proportion to the square of the driving voltage while being changed in conformity with the thickness d of the liquid crystal layer, so that such a low driving voltage extremely deteriorates the response speed. According to the results of actual measurements, the black-and-white response speed of this device is 46 msec (approx. 50 msec), and in a half tone, the response speed is lowered to 100 msec or so due to a further drop of the driving voltage, hence causing manifest difficulty for practical use. Thus, in the known device, it is necessary to reduce the value of Δn under 0.1 in view of the response speed.

As described above, the present invention has been accomplished by newly finding the requisite value of Δn of the liquid crystal material so as to realize an improved reflex vertically-aligned liquid crystal device where the thickness d of its liquid crystal layer is less than 2 μm. Therefore, even if the thickness d of the liquid crystal layer is less than 2 μm, the saturation voltage can be lowered by selectively adjusting the refractive index anisotropy as Δn≧0.1, hence enhancing the response speed as well.

The table shown below gives the values of Δn (also those of Δε) of vertically-aligned liquid crystal materials (made by Merck Ltd.,).

|  | Vertically-aligned liquid crystal material | | | |
| --- | --- | --- | --- | --- |
|  | Sample A | Sample B | Sample C | Sample D |
| Δn | +0.082 | +0.103 | +0.114 | +0.13 |
| n (∥) | 1.557 | 1.584 | 1.598 | 1.62 |
| n (⊥) | 1.475 | 1.481 | 1.484 | 1.49 |
| Δε | −4.1 | −0.5 | −5.3 | −4.3 |
| ε (∥) | 3.5 | 4.0 | 3.9 | 3.8 |
| ε (⊥) | 7.6 | 9.0 | 9.2 | 8.1 |

Next, a description will be given on the advantage that the vertically-aligned liquid crystal display device of the invention is more effective for an optical unit of a smaller F number as compared with any known device.

Figure 8:
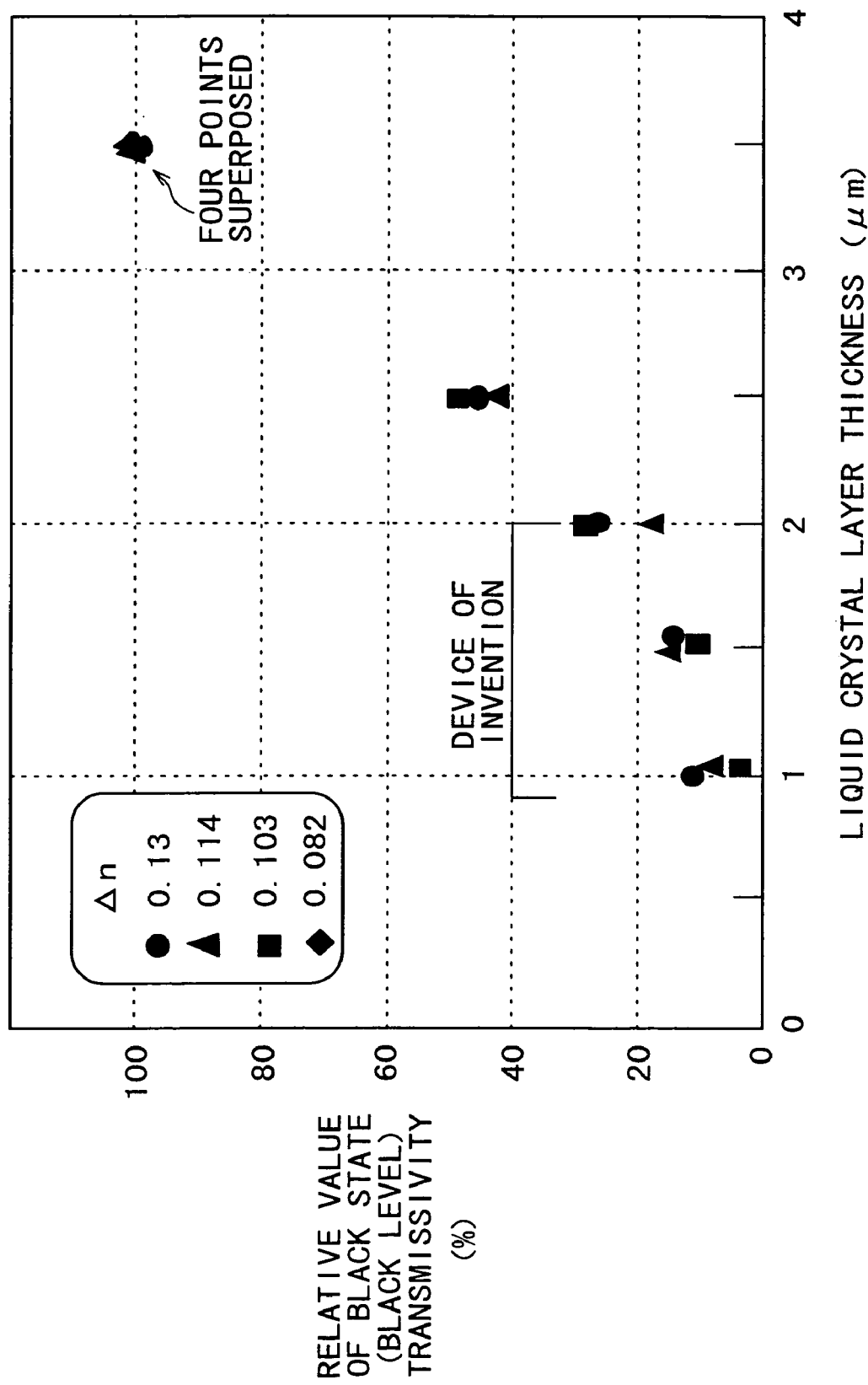
FIG. 8 graphically shows the dependency of the black-state transmissivity on the thickness of the same liquid crystal layer (in comparison with the black-state value as 100% of a liquid crystal layer being 3.5 μm thick in a known device)

First, it has been found that the black level in the device of the invention having a thinner liquid crystal layer can be lowered under the black level obtained in the known device where the liquid crystal layer has a thickness of 3 to 4 μm. In FIG. 8, each black level value (black-state transmissivity at zero voltage) in the vertically-aligned liquid crystal display device of the invention is graphically shown as a function of the thickness of the liquid crystal layer. In the respective materials, the numerical values obtained with a layer thickness of 3.5 μm are expressed as 100% (where the abscissa represents the thickness of the liquid crystal layer).

When the applied voltage is zero, the liquid crystal molecules are oriented to be substantially vertical to the substrate plane, so that in principle the incident light is reflected without any change of the polarized state and then is returned to the incidence side by means of a polarized beam splitter. However, in the actual device, the liquid crystal molecules are inclined at a pretilt angle and are therefore rendered slightly elliptical, and moreover the light separation characteristic of the polarized beam splitter is dependent on the incidence angle as mentioned, whereby the black-state transmissivity is raised to consequently deteriorate the contrast.

Meanwhile in the display device of the present invention, it has been found that the black-state transmissivity is lowered with a reduction of the thickness of the liquid crystal layer and, as shown in FIG. 8, the black level value obtained with a layer thickness of 2 μm becomes 20–30% as compared with the value in the known device, or 10–20% with a layer thickness of 1.5 μm, or 5–15% with a layer thickness of 1.0 μm. (But when the layer thickness is 2.5 μm, the black level value becomes high as 40–50%). Regarding the contrast which is expressed by the ratio of white and black levels, since the white level is kept substantially unchanged, the result shown in FIG. 8 indicates that the contrast attained in the device of the present invention becomes higher than five to ten times or more with a layer thickness of 1.5 μm for example.

Such fall of the black level value with a reduction of the thickness of the liquid crystal layer is considered to be based principally on the following reasons. The transmissivity T of the liquid crystal in the device of the present invention is expressed by Eq. (4).

$$T \propto \sin^2(2d \cdot \Delta n(\textit{eff}) \cdot \pi/\lambda) \quad (4)$$

In the above, λ denotes the wavelength of the light, and Δn(eff) denotes the effective refractive index anisotropy corresponding to the inclination angle θ from the perpendicular direction of liquid crystal molecules. This anisotropy is expressed by Eq. (5).

$$\Delta n(\textit{eff}) = \frac{n(\parallel)n(\perp)}{\sqrt{[n(\parallel)^2 \cdot \cos^2(\theta) + n(\perp)^2 \cdot \sin^2(\theta)]}} - n(\perp) \quad (5)$$

The inclination angle θ of the liquid crystal molecules is widened with a rise of the liquid crystal driving voltage, and Δn(eff) is increased correspondingly thereto to raise the transmissivity consequently. It is seen that, when θ=90° in principle, Δn(eff) becomes equal to the value of Δn of the liquid crystal material. According to Eq. (4), the transmissivity T becomes 100% when the condition of 2d·Δn(eff)·π/λ=π/2 is satisfied. a black state, becomes zero if the liquid crystal molecules are oriented completely vertically as (θ=0), so that Δn(eff)=0. Actually, however, the liquid crystal molecules are oriented with a pretilt angle of 1 to 7° as mentioned, whereby the value of Δn(eff) is rendered finite to consequently give the black-state transmissivity. As the black-state transmissivity is raised with an increase of the pretilt angle, it is preferred that the pretilt angle be controlled to less than 5°. Since 2d·Δn(eff)·π/λ has a small value at the black level, Eq. (4) may be rewritten approximately as $$T \propto \sin^2(2d \cdot \Delta n(\textit{eff}) \cdot \pi/\lambda) \approx (2d \cdot \Delta n(\textit{eff}) \cdot \pi/\lambda)^2.$$

Therefore, T is theoretically considered to be proportional to the square of the thickness d of the liquid crystal layer. The data of FIG. 8 obtained from the actual measurement can be explained substantially in accordance with this relation.

Thus, the thickness d of the liquid crystal layer in this device is so designed as to be less than 2 μm, and therefore the black level can be suppressed low essentially in comparison the known device where the layer thickness is 3 to 4 μm, hence realizing a high contrast.

If the F number of the optical unit is decreased in the known device, the black level is raised to eventually fail in ensuring a desired contrast, and therefore it is unavoidable to set the F number forcedly to more than 3.5, as already described. However, in the device of the present invention, the black level in the device itself is held extremely low as explained, so that a sufficiently high contrast can be ensured even in the optical unit having a small F number.

Figure 9:
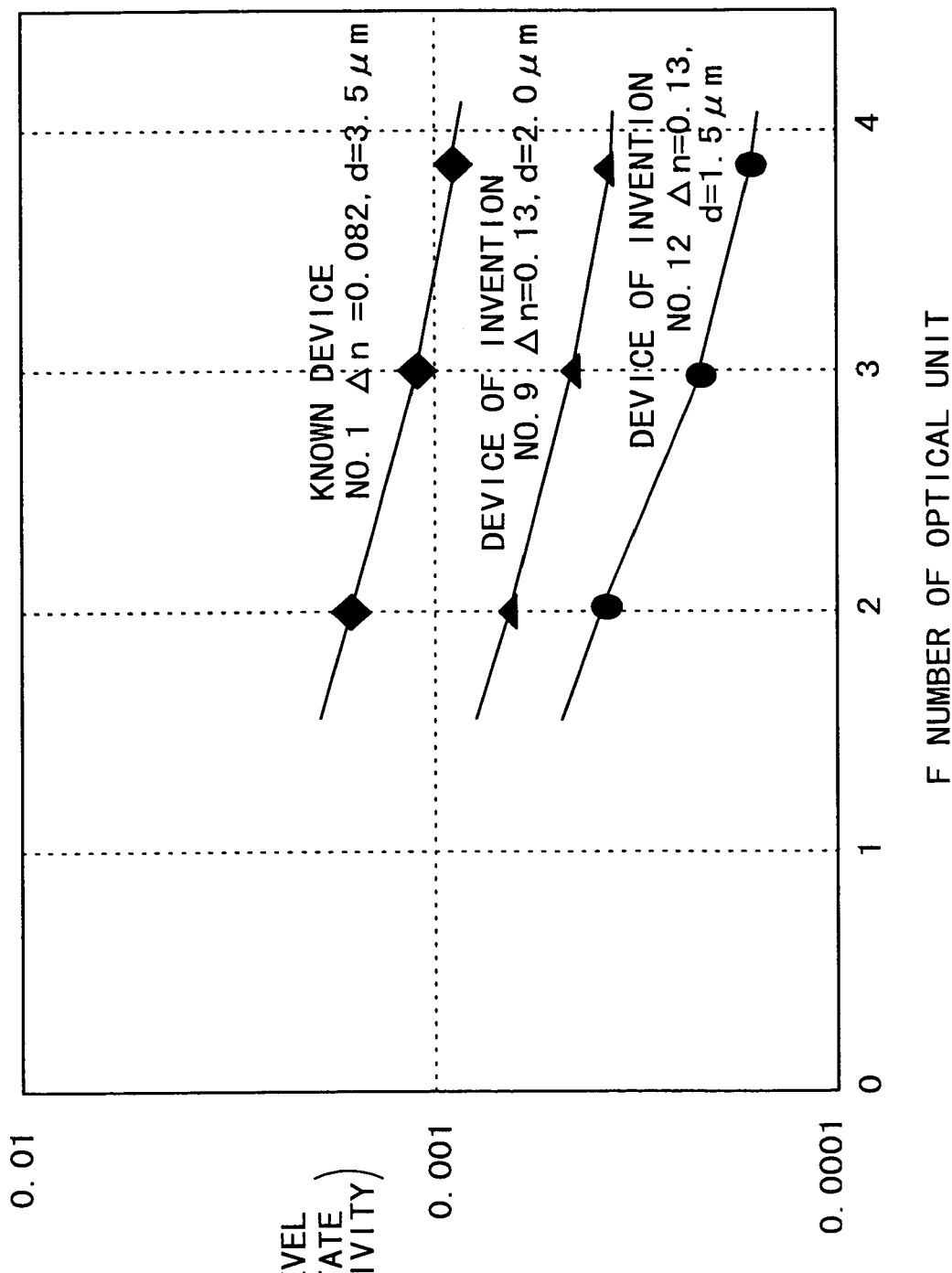
FIG. 9 graphically shows the black level changes caused in the reflex vertically-aligned liquid crystal device of the present invention in comparison with the black level changes relative to the F number of a measuring optical unit in the known device.
Figure 10:
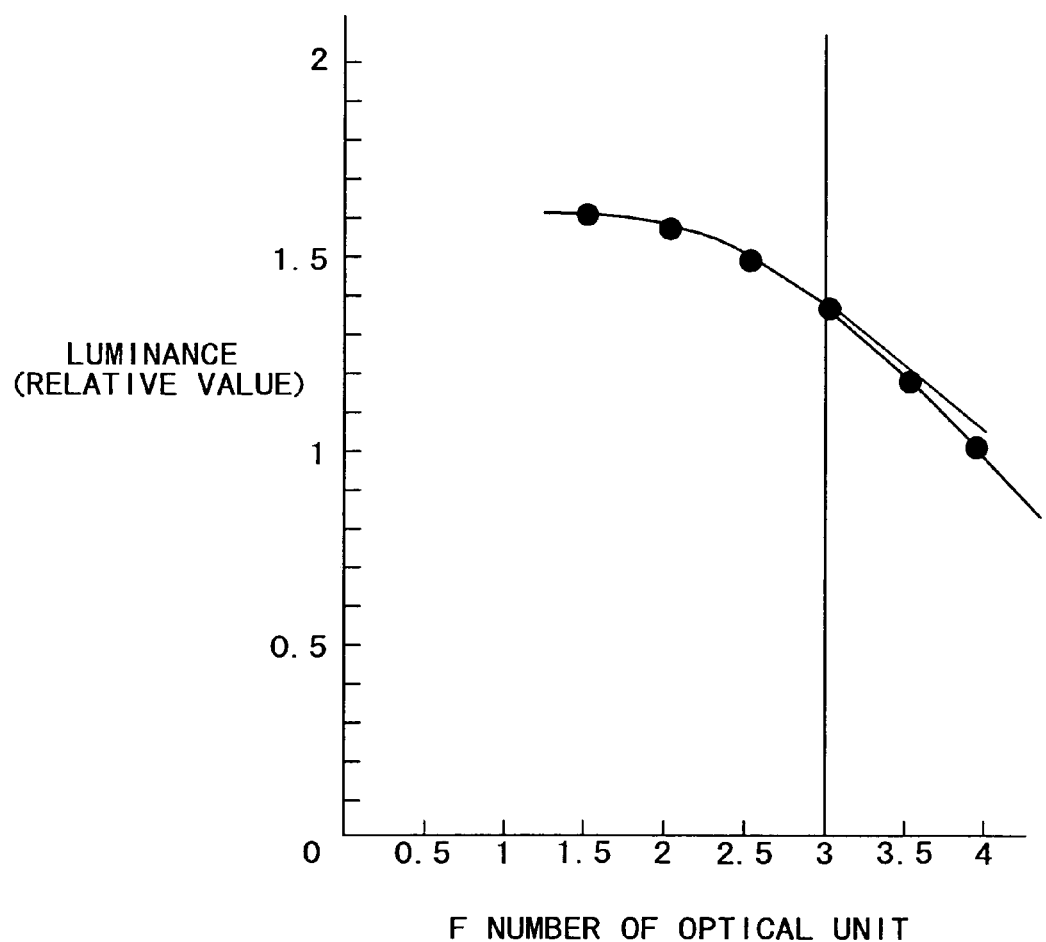
FIG. 10 graphically shows the luminance changes caused in the same liquid crystal device relative to the F number.

FIG. 9 graphically shows changes caused in the black-state transmissivity by changing the F number of the projection lens 5 in FIG. 17 and that of the measuring optical unit corresponding to the illumination optical unit. The black level rises with a decrease of the F number, but in the device of the present invention, the black level is kept lower than in the known device at any F number, whereby a sufficiently high contrast can be realized even in the optical unit having a smaller F number under 3. Moreover, a satisfactory high luminance is still attained with an F number of less than 3, as shown in FIG. 10. (However, the luminance is saturated when the F number is under 2). And the luminance is considerably lowered if the F number exceeds 3.

Regarding the luminance, it has been found experimentally that, in a practical projection system with an optical unit using a 120 W lamp in a diagonally 0.7-inch device for example, the luminance is enhanced approximately 60% when the F number is changed from 3.85 to 2.

As mentioned above, a superior projection system, which is capable of meeting the requirements for both a higher contrast and a higher luminance in comparison with any known system using the conventional device and optical unit, can be provided due to the display device of the present invention and also to a projection optical system and a projection display system each employing an optical unit of an F number under 3.

Hereinafter the preferred embodiment of the present invention will be described more specifically with some comparative examples.

COMPARATIVE EXAMPLE 1

Each conventional known device was produced as follows. First, a glass substrate with a transparent electrode and a driving circuit substrate of silicon with an aluminum electrode were washed and then were introduced into an evaporator, where a liquid crystal orientation film of $SiO_2$ was formed by oblique evaporation in an angular range of 45 to 55°. The thickness of the liquid crystal orientation film was set to 50 nm, and the pretilt angle of the liquid crystal was so controlled as to be approximately 2.5°.

Thereafter an adequate number of glass beads having a diameter of 1 to 3.5 µm were sprinkled between the two substrates where the liquid crystal orientation film was formed, and the two substrates were joined together. Subsequently, a vertically-aligned liquid crystal material (made by Merck Ltd.,) having a negative permittivity anisotropy $\Delta\epsilon$ and a refractive index anisotropy $\Delta n$ of 0.082 was injected between the substrates to thereby produce six kinds of reflex liquid crystal display devices (samples Nos. 1–6 in FIG. 5) where the liquid crystal layer thickness (cell gap) was 3.5 µm, 2.9 µm, 2.5 µm, 2 µm, 1.5 µm and 1 µm respectively.

In each of the devices thus produced, a voltage was applied between the transparent electrode and the aluminum electrode, and the changes caused in the transmissivity of the liquid crystal by changing the applied voltage were measured. (Since the devices are of reflex type, actually the reflectivity thereof is measured. However, measuring the reflectivity is equivalent to measuring the transmissivity of the liquid crystal, and therefore it will be so described below.) The measurement was performed at room temperature.

Figure 15:
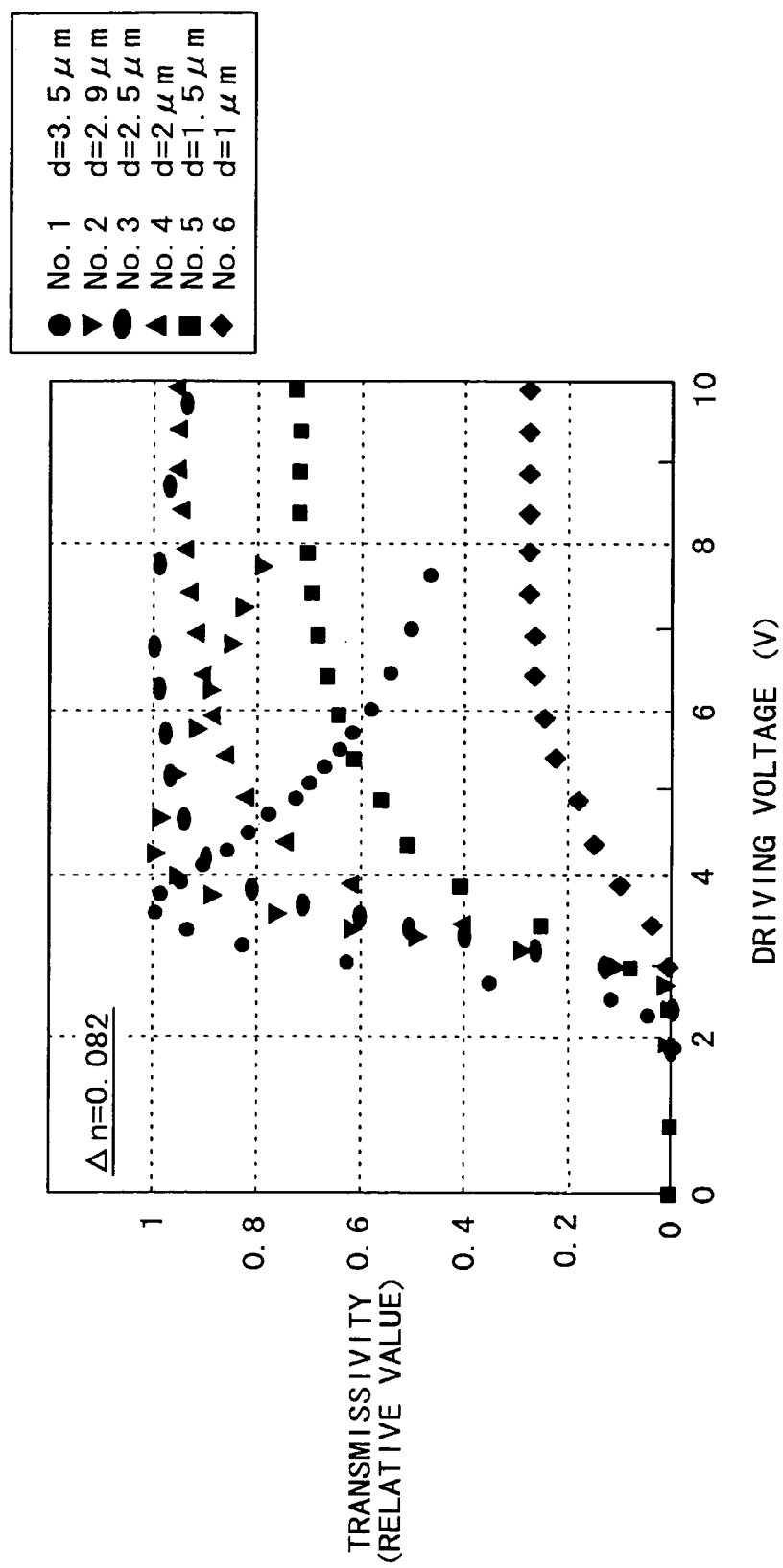
FIG. 15 graphically shows V-T curves obtained while reducing the thickness of the liquid crystal layer in the known device (where Δn=0.082)
Figure 16:
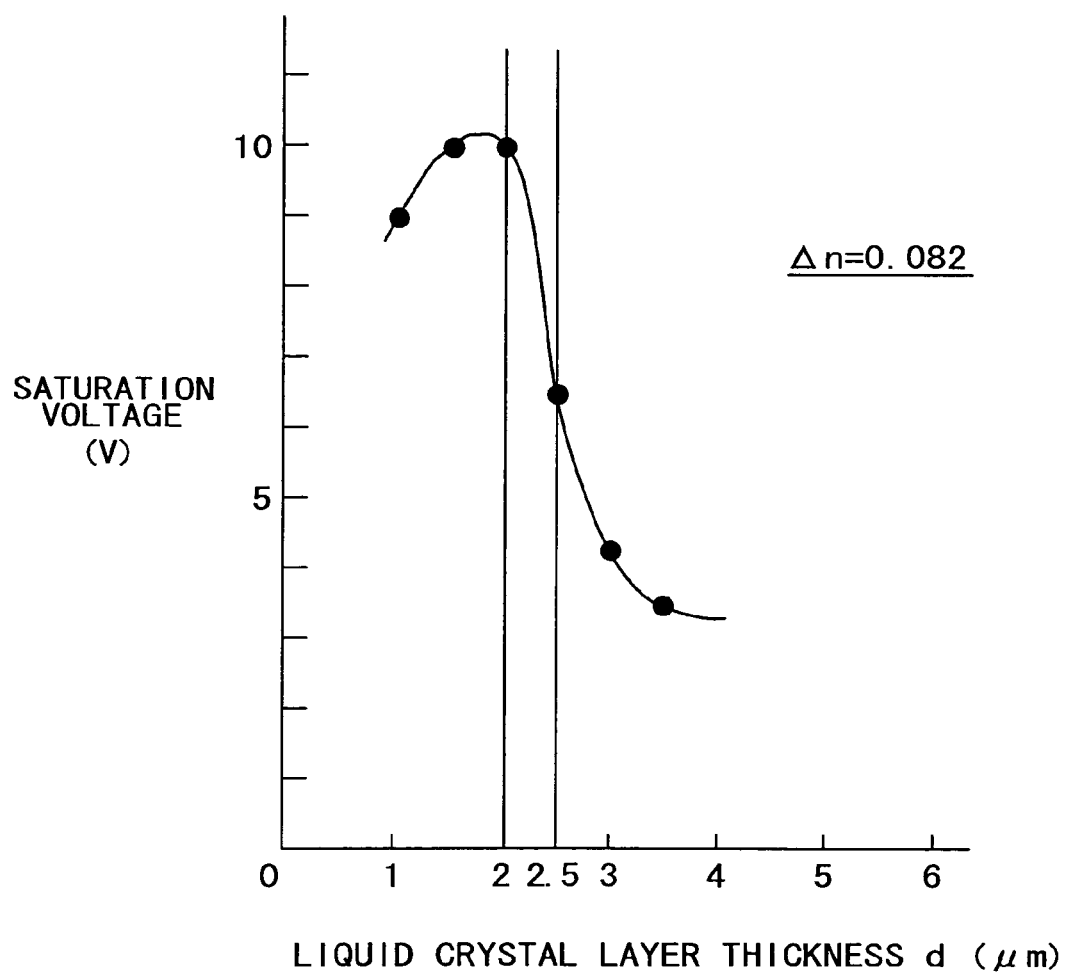
FIG. 16 graphically shows the changes caused in the saturation voltage in accordance with the thickness of the same liquid crystal layer.

FIG. 15 graphically shows the liquid crystal driving characteristics of such devices. As shown in FIGS. 15 and 16, the saturation driving voltage rises sharply over 6V when the thickness of the liquid crystal layer is less than 2.5 µm.

[Embodiment]1

In the same method as adopted for Comparative example 1 mentioned above, a liquid crystal orientation film of $SiO_2$ was formed on each of a substrate with a transparent electrode and a driving circuit substrate of silicon with an aluminum electrode, and three kinds of vertically-aligned liquid crystal materials (made by Merck Ltd.,) having a negative permittivity anisotropy $\Delta\epsilon$ and a refractive index anisotropy $\Delta n$ of 0.103, 0.114 and 0.13 were injected between the two substrates to thereby produce nine kinds of reflex liquid crystal display devices (samples Nos. 7–15 in FIG. 5) where the liquid crystal layer thickness (cell gap) was 2 µm, 1.5 µm and 1 µm respectively. The pretilt angle of the liquid crystal was so controlled as to be approximately 2.5°.

The liquid crystal driving characteristics of the devices thus produced were measured at room temperature similarly to Comparative example 1. FIGS. 1, 2 and 3 graphically show the driving characteristics obtained in three cases where the thickness of the liquid crystal layer is 2 µm, 1.5 µm and 1 µm respectively. FIG. 5 is a table showing the driving voltages of the individual devices at which the transmissivity is saturated substantially, and also the respective values of the transmissivity.

It is seen from such results that, as $\Delta n$ is controlled to be more than 0.1, the transmissivity is saturated easily at a low voltage of 4 to 6V despite reduction of the liquid crystal layer thickness d under 2 µm, whereby practical driving can be performed. Furthermore, since the transmissivity is much enhanced in comparison with any conventional device, it becomes possible to realize an improved silicon reflex type vertically-aligned liquid crystal display device having a sufficient transmissivity and superior driving characteristic.

Other devices were also produced by forming, as a liquid crystal orientation film, a polyimide film instead of a silicon dioxide film, and controlling the orientation by rubbing. The results were the same as those mentioned above.

[Embodiment]2

The response speed relative to a rise time (from black to white) and a fall time (from white to black) was measured in each of the reflex liquid crystal display devices produced in Embodiment 1. The sum total thereof is regarded as the response speed of each device, and the result is shown in FIG. 5. The measurement was performed at room temperature. FIG. 4 graphically shows the thickness d of the liquid crystal layer as a function with regard to the device having $\Delta n=0.13$ as a representative example (samples Nos. 9, 12, 15 with d=2.5 µm in FIG. 5). For comparison, FIG. 4 also shows the response speeds of the known sample No. 1 and the sample produced with d=3 µm ($\Delta n=0.082$ in each sample).

As supposed from Eqs. (1) and (2), the response speed changes substantially in proportion to the square of the thickness of the liquid crystal layer. In the device of the present invention where the layer thickness d is less than 2 µm and $\Delta n$ is more than 0.1, it was proved to realize a high-speed response faster than 9 msec.

COMPARATIVE EXAMPLE 2

In the same method as adopted for Embodiment 1, a reflex liquid crystal device (sample No. 16) was produced by using a liquid crystal material of Δn=0.13 with a layer thickness of 3.5 μm, and the liquid crystal driving characteristic was measured.

FIG. 7 graphically shows the result in comparison with the characteristic of sample No. 1 obtained with Δn=0.082. As shown, the driving voltage in the device (sample No. 16) was much lower. The response speed measured at room temperature in the same manner as in Embodiment 2 was 46 msec. Since the driving voltage in a half tone is low as 1V or so, the response speed was rendered lower, and in a gray-scale gradation of 25%, the response speed was further lowered to the vicinity of 100 msec.

[Embodiment 3]

The transmissivity (black level) at a zero applied voltage (black state) was measured in the reflex liquid crystal display device produced in Embodiment 1. For systematically examining the black level changes caused in relation to the thickness of the liquid crystal layer, devices having a layer thickness of 3.5 μm (samples Nos. 17–19) were produced with the aforementioned samples of Δn, and also devices having a layer thickness of 2.5 μm were produced similarly, and the black-level transmissivity of each device was measured together with the samples (Nos. 7–15) of Embodiment 1. The respective black level values are graphically shown in FIG. 8 where the numerical values obtained in the devices with a layer thickness of 3.5 μm are indicated as 100% with the individual samples of Δn.

As shown in FIG. 8, the black level is extremely lowered when the liquid crystal layer becomes thinner than 2 μm in any sample of Δn. In the device with a layer thickness of 1.5 μm for example, the indicated black level is lower by 10 to 20% than the value obtained in any device with a layer thickness of 3.5 μm. That is, the contrast of the device becomes so high as 5 to 10 times. In the measuring optical unit of FIG. 7 having an F number of 3.85, this trend remained substantially the same despite any change of the F number.

[Embodiment 4]

The devices (samples Nos. 12, 9) of Embodiment 1 with Δn=0.13 and a liquid crystal layer thickness of 1.5 am and 2.0 μm were incorporated in the measuring optical unit having an F number of 3.85, 3 and 2, and the black level (black-state transmissivity) of each device was compared with that of the known device (sample No. 1).

FIG. 9 graphically shows the results of such comparison. The black level rises with a decrease of the F number. However, in the device of the present invention, the black level is maintained lower than that in the known device despite any change of the F number. The white level transmissivity in each device was kept substantially unchanged at 0.6 or so. Therefore, the black level ratio directly gives the contrast ratio of the device. According to the device of the invention, it is seen that in any optical unit having a small F number under 3, an equal or higher contrast can be realized as compared with the known device. The lower limit of the F number may be set preferably to 1.5, further preferably to 2.0.

In conformity with the specification described above, a diagonally 0.7-inch silicon reflex type vertically-aligned liquid crystal display device was produced, and the luminance obtained by the use of a 120 W lamp as a light source was compared in a practical projection optical unit having an F number of 3.85, 3.5, 3, 2.5 and 2. The results are graphically shown in FIG. 10 where, as compared with the luminance obtained in an optical unit of F number=3.85, the luminance is enhanced about 32% with F number=3, about 44% with F number=2.5, about 60% with F number=2, and sharply enhanced with F number≦3. However, the luminance was enhanced merely 15% or so with F number=3.5, or not changed substantially with F number=1.5 as compared with the value obtained with F number=2. Regarding the contrast, even in an optical unit with F number≦3, the contrast attained was higher than the value in the known device, as mentioned. That is, a superior projection system was realized to meet the requirements for both a higher luminance and a higher contrast in comparison with those in the known device.

It is to be understood that the embodiments and examples of the present invention described above may be modified variously on the basis of the technical concept of the invention.

For instance, the structure, material and so forth of the component parts of the reflex liquid crystal display device or those of an optical or projection system equipped with such display device are not limited merely to the aforementioned ones alone, and may be altered with a variety of modifications.

Thus, according to the present invention where the Δn of the vertically-aligned liquid crystal material is controlled to be more than 0.1, the transmissivity of the liquid crystal is saturated with facility at a low voltage below 5 to 6V despite a reduction of the thickness of the vertically-aligned liquid crystal layer to less than 2 μm, hence achieving satisfactory driving at a practically low voltage while attaining another advantage of remarkable improvement in the transmissivity itself. Therefore, it becomes possible to realize a superior reflex type vertically-aligned liquid crystal display device which indicates a sufficient transmissivity, an excellent low-voltage driving characteristic (low required withstand voltage) and fast response as well. Further improvements are realizable in a display apparatus, a projection optical system and a projection display system by the use of such a display device.

In these systems where the thickness of the vertically-aligned liquid crystal layer is reduced to less than 2 μm, the black level, which is considered to be proportional to the square of the thickness of the liquid crystal layer, can be held low to thereby achieve a high contrast even when the F number of the optical unit is less than 3, and a high luminance is also achievable with a small F number. Consequently, it becomes possible to provide a superior system which is capable of satisfying the requirements for both a high contrast and a high luminance.

What is claimed is:

1. A reflex liquid crystal display device comprising:
   a first substrate with a transparent electrode;
   a second substrate with a light reflective electrode; and
   a layer of vertically-aligned liquid crystal material interposed between said first and second substrates positioned opposite to each other in a state where said transparent electrode and said light reflective electrode have mutually opposed surfaces,
   wherein an alignment film is formed on each of the mutually opposed surfaces of said transparent electrode and said light reflective electrode, and the thickness of said vertically-aligned liquid crystal layer is less than 2 μm, the refractive index anisotropy Δn of said liquid crystal material is more than 0.1 and less than 0.13, and said vertically-aligned liquid crystal layer includes a plurality of liquid crystal molecules each having a pre-tilt angle controlled within a range of 1° to 7°,
   wherein a voltage for saturating a light output with respect to a light input to said layer is within a range of less than 6 volts.

* * * * *